United States Patent [19]

Coelln

[11] Patent Number: 5,540,314
[45] Date of Patent: Jul. 30, 1996

[54] DIRT EJECTING BALL TRANSFER UNIT

[76] Inventor: Axel Coelln, 105 Harbor Dr., #139, Stamford, Conn. 06905

[21] Appl. No.: 382,140

[22] Filed: Feb. 1, 1995

[51] Int. Cl.⁶ ................................... B65G 13/00
[52] U.S. Cl. ...................................... 193/35 MD
[58] Field of Search ................. 193/35 MD; 244/137.1; 384/490, 491, 495

[56]  References Cited

U.S. PATENT DOCUMENTS

| | | | |
|---|---|---|---|
| 1,963,956 | 6/1934 | Craig | 193/35 MD X |
| 3,920,290 | 11/1975 | Evarts | 193/35 MD X |
| 4,036,345 | 7/1977 | Webb | 193/35 MD X |
| 4,871,052 | 10/1989 | Huber | 193/35 MD |

FOREIGN PATENT DOCUMENTS 1150429  1/1958  France ............................ 193/35 MD
1297185  11/1962  France ............................ 193/35 MD Primary Examiner—James R. Bidwell
Attorney, Agent, or Firm—St. Onge Steward Johnston & Reens

[57]  ABSTRACT

A dirt ejecting ball transfer unit comprises a housing containing a cup with a substantial aperture, and a load bearing ball supported on ball bearings. The housing is provided with a series of apertures that overlap with the cup's substantial aperture to define a plurality of passage entries into the housing apertures. The passage entries have an elongate shape. The housing apertures have a minimum width which is substantially larger than the minimum width of the passage entries. Dirt and other contaminants that penetrate the seals of the ball transfer unit are quickly ejected through the housing apertures when the ball is rotated under load, thereby preventing failure of the ball transfer unit.

19 Claims, 2 Drawing Sheets

DIRT EJECTING BALL TRANSFER UNIT

FIELD OF THE INVENTION

The present invention relates to a transfer system for conveying containers such as pallets and the like, and more particularly, to a component of such a system known as a ball transfer unit.

BACKGROUND OF THE INVENTION

Ball transfer units (BTUs) are used for movement of pallets or cargo containers from one location to another. Generally, each ball transfer unit has a ball or roller, which projects above a "ball deck" and which is capable of freely rolling. The ball contacts a portion of the bottom surface of the container being conveyed along the deck. The container can be moved manually or by mechanical propulsion. The pallet or container is moveable along the ball deck by the reduced friction provided by the BTUs in the ball deck.

Prior art BTU assemblies typically include a cylindrical housing with an open top and a closed bottom having an aperture therein, a hemispherical cup seated in the housing, a plurality of ball bearings contained in the cup, and a ball seated on the ball bearings. The ball and ball bearings are retained in the cup and housing by a seal and retaining cover mounted to the housing. A typical prior art BTU is provided with a small drain hole in the center of the hemispherical cup to permit escape of moisture and liquids that penetrate the seal and that might contribute to corrosion of the ball bearings. Materials that escape from the cup through this drain hole then pass through the aperture in the bottom of the housing.

These typical prior art BTUs are extremely susceptible to contamination with dirt and other materials. In particular, if particulate or gummy contaminants or both become coated on the ball, the seal is often ineffective to remove the contaminants as the ball rotates, inevitably causing the contaminants to be collected inside the cup with the ball bearings, gumming up the ball bearings. This causes increased friction, decreasing the effectiveness of the prior art BTUs, and over time, these prior art BTUs will complete freeze up, i.e., it will not turn even when a force is applied. It has been found in typical applications such as airplane cargo, that prior art BTUs of this type must be replaced sometimes as often as once each year, and in very dirty applications, that replacements can be necessary as often as one time per month. This represents a significant cost in parts and labor.

What is desired, therefore, is a ball transfer unit in which the ball bearings will not become contaminated, thereby providing a substantially longer service life. Heretofore, improvements in a conventional BTU have been made in the seal mechanism, in an effort to prevent a contaminant from entering the unit. However, while these changes provided some improvements to service life, the improvements have not been significant.

SUMMARY OF THE INVENTION

Accordingly, it is an object of the present invention to provide a ball transfer unit that minimizes frictional drag caused by contaminants, and minimizes the significant degradation of performance and operating life caused by dirt and other contaminants entering the ball bearings.

A dirt ejecting ball transfer unit in accordance with the invention comprises a housing containing a cup with a substantial aperture, and a load bearing ball supported on ball bearings. The housing is provided with a series of apertures that overlap with the cup's substantial aperture to define a plurality of elongate passage entries into the housing apertures. The housing apertures have a minimum width which is substantially larger than the minimum width of the passage entries. Dirt and other contaminants that penetrate the seals of the ball transfer unit are quickly ejected through the passage entries and the housing apertures when the ball is rotated under load, thereby preventing failure of the ball transfer unit.

Other objects, aspects and features of the present invention in addition to those mentioned above will be pointed out in or will be understood from the following detailed description provided in conjunction with the accompanying drawings.

DETAILED DESCRIPTION OF THE DRAWINGS

Figure 1:
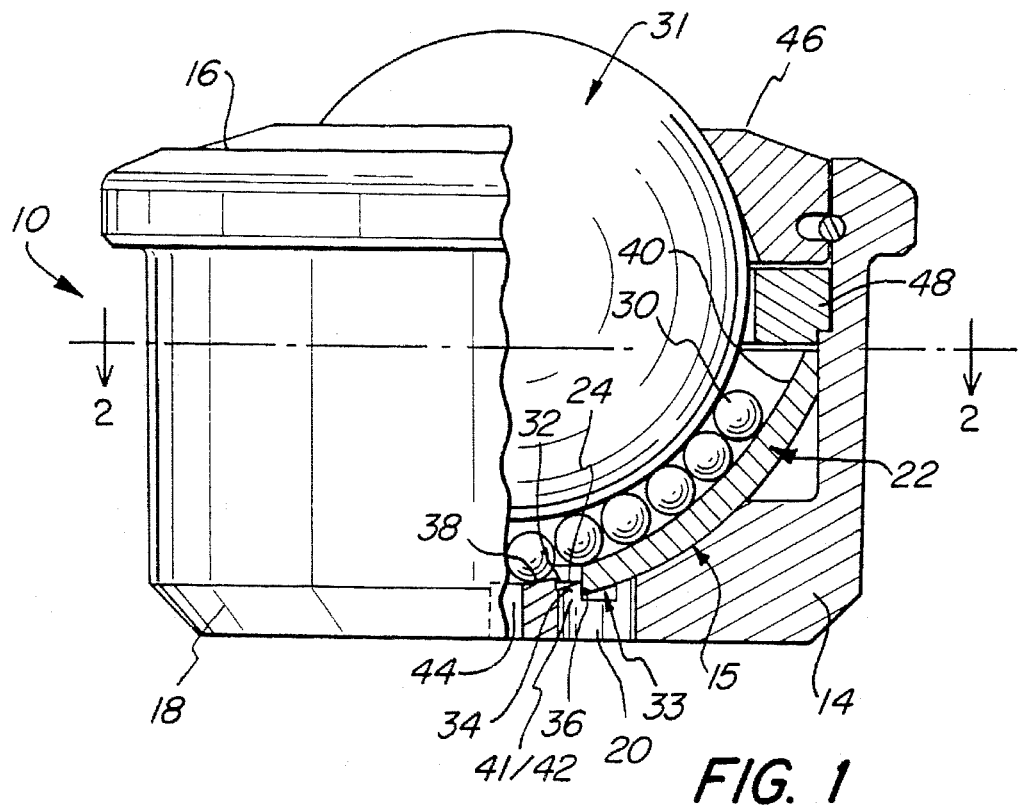
FIG. 1 is a side elevation view, in partial cross section, of a ball transfer unit in accordance with the invention.
Figure 2:
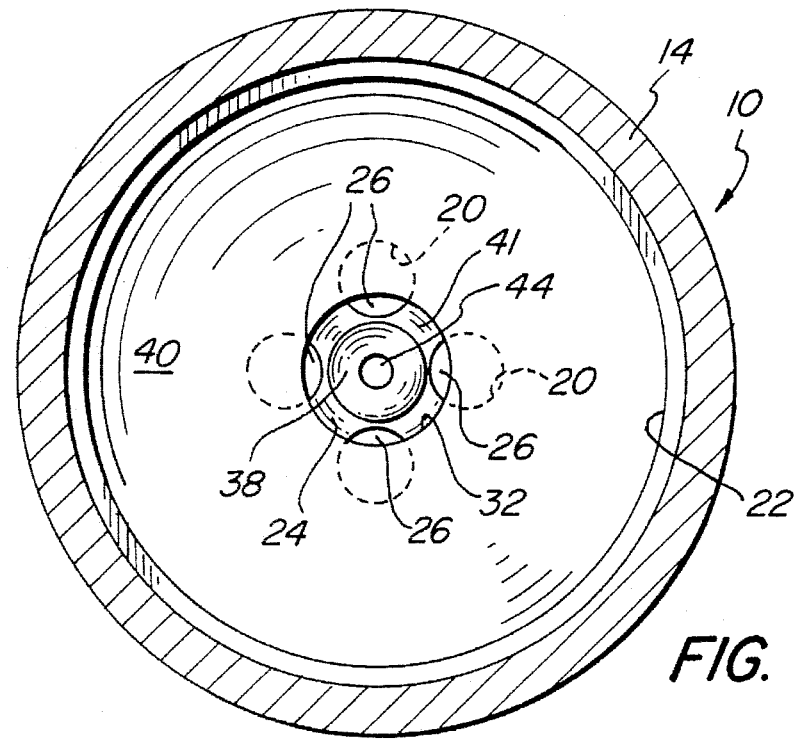
FIG. 2 is a cross-sectional view along the line 2—2 of FIG. 1, showing the cup and housing of the ball transfer unit with its ball and ball bearings removed.
Figure 3:
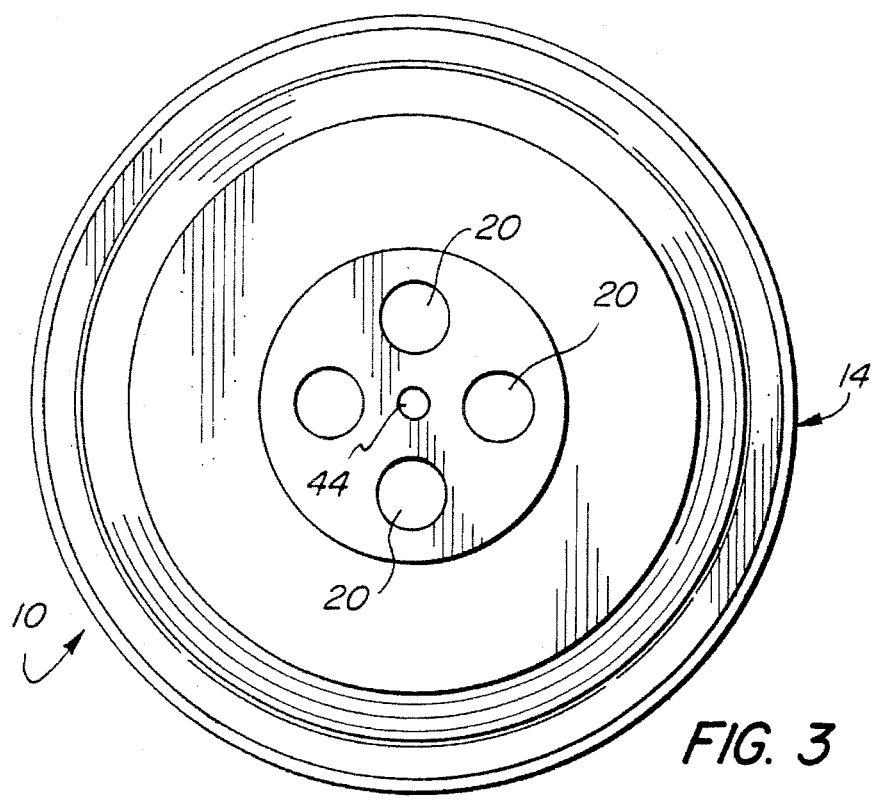
FIG. 3 is a bottom plan view of the ball transfer unit shown in FIG. 1.
Figure 4:
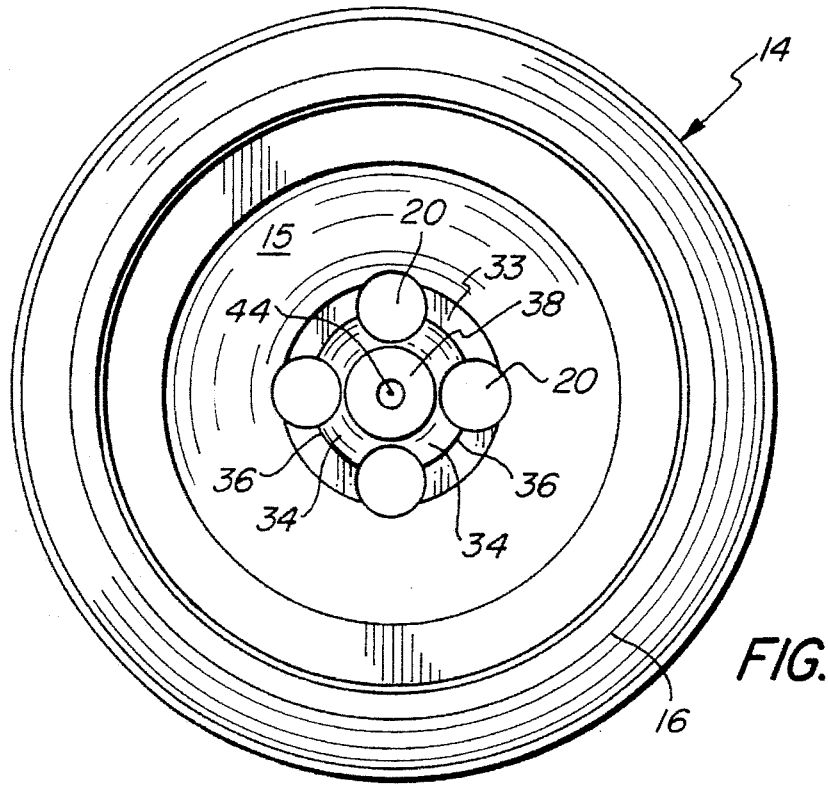
FIG. 4 is the cross-sectional view of FIG. 2, with the cup of the ball transfer unit removed.

Referring to FIGS. 1–4 in detail, a ball transfer unit 10 in accordance with the invention is shown. In the Figures, the same figure numbers are used to identify like elements in the Figures. Ball transfer unit 10 is intended to be inserted into a ball deck or field and comprises a housing 14, a cup 22 supported within housing 14, a plurality of ball bearings 30, a ball 31, and a ball retaining ring 46.

Housing 14 is cylindrical and has an open upper end 16 and a closed lower end 18. The closed lower end 18 is provided with a plurality of housing apertures 20. Apertures 20 are preferably centrally located in lower end 18 and penetrate the lower end 18. Most preferably, said apertures 20 comprise four circular holes symmetrically spaced around a center point of the lower end 18 of the housing 14.

Cup 22 is seated in housing 14. Cup 22 has a substantial central aperture 24. Central aperture 24 in the cup 22 and the housing apertures 20 are located relative to each other such that when the cup 22 is seated in the housing 14 an overlap of the central aperture 24 and housing apertures 20 define a plurality of passage entries 26 above the housing apertures 20. Passage entries 26 thus have an elongate shape with a longer length dimension and a smaller width dimension. The passage entries may also comprise slots, oblongs, ellipses or other similar shapes. These passage entries 26 have a minimum width which is less than the diameter of the ball bearings 30 that support the load bearing ball 31. This prevents the ball bearings 30 from escaping from the cup 22 through the apertures 20 and 24.

The housing apertures 20 have a minimum width which is substantially larger than the minimum width of the passage entries 26, to prevent clogging of these apertures by contaminants after they are cleared through the passage entries 26.

Cup 22 is preferably a hemispherical cup. As used herein "hemispherical cup" means any type of cup shaped to receive a ball and support it on ball bearings. Thus the hemispherical cup may have a height which might be greater or less than exactly 50% of a sphere, or it may have different shapes in its ball supporting face and its opposing face, or it may have a rounded concave shape that deviates from an exact spherical surface, for example it may have a partial parabolic or other curved shape. Housing 14 will have a shaped base 15 to receive cup 22. In FIGS. 1–4 it can be seen that base 15 is generally hemispherical to match the exterior surface of cup 22.

Means for centering the cup 22 in the housing 14 are provided. The centering means are unique in that they are effective to maintain the components together in a fixed relationship while still providing effective discharge of contaminants and dirt from the ball transfer unit 10. Preferably, the centering means comprise an annular channel 33 for receiving a lip 32 of the central aperture 24 of the cup 22. Annular channel 33 is provided in the lower end 18 of the housing 14. Annular channel 33 intersects with the housing apertures 20 to thereby define a central cross-shaped centering structure 34 that has cross ends 36 that interfit with the lip 32 of the cup aperture 24 thereby centering cup 22. Preferably, the central cross-shaped centering structure 34 has a central upper cylindrical surface 38 that is located at a level substantially consistent with the level of the upper surface 40 of the cup 22. Cup lip 32 is spaced apart from the central cylindrical surface 38 by an annular moat 41. The passage entries 26 are located at spaced apart locations at a lower end 42 of the annular moat 41. The provision of the upper cylindrical surface 38 at the same level as the upper surface 40 of cup 22 permits more effective use of ball bearings 30 to support ball 31, while preventing the ball bearings 30 from escaping from cup 22.

Preferably, an auxiliary drainage hole 44 extends from the central cylindrical surface 38 through the housing 14, principally to improve drainage of moisture.

Means for retaining the ball 31 in the cup 22 and housing 14 are provided and may be of the conventional type, such as retaining ring 46. A wiper 48, for example a wiper having multiple layers of any suitable cloth, such as a durable felt may be provided, but is not necessary as the invention accomplishes its goals by removal of contaminants, instead of by trying to prevent entry of contaminants as taught in the prior art. Thus there is only a minimal need to prevent entry of contaminants.

The present invention is operative to prevent excessive build up of dirt and contaminants that steadily increase the frictional resistance to movement in conventional ball transfer units, and which eventually causes ball transfer units to seize up. In laboratory testing it has been found that the invention substantially outperforms conventional designs. Dirt and other contaminants that penetrate the seals of the ball transfer unit 10 are quickly ejected through the housing apertures 20 when the ball 31 is rotated under load, thereby preventing failure of the ball transfer unit 10.

Although the operation of only one ball transfer unit 10 was described, it should be understood that multiple such units 10 will be used in a ball deck to contact and support containers to be conveyed thereon. It should be understood by those skilled in the art that obvious modifications can be made without departing from the spirit of the invention.

I claim:

1. A dirt ejecting ball transfer unit, comprising:

a housing having an open upper end and a closed lower end, said closed lower end being provided with a plurality of housing apertures;

a hemispherical cup seated in said housing, said cup having a substantial aperture in a central portion thereof;

a plurality of ball bearings having a diameter seated in said cup;

a load supporting ball seated on said ball bearings in said cup;

said substantial aperture in said cup and said apertures in said housing being located whereby an overlap of said substantial aperture and housing apertures define a plurality of passage entries above said housing apertures, said passage entries having an elongate shape with a minimum width which is less than said diameter of said ball bearings whereby said ball bearings are prevented from escaping from said cup;

means for retaining said ball in said cup and housing.

2. A dirt ejecting ball transfer unit in accordance with claim 1, further comprising means for centering said cup in said housing.

3. A dirt ejecting ball transfer unit in accordance with claim 1, wherein said housing apertures comprise four circular holes.

4. A dirt ejecting ball transfer unit in accordance with claim 3, wherein said four circular holes are symmetrically spaced around a center point of said lower end of said housing.

5. A dirt ejecting ball transfer unit in accordance with claim 2, wherein said means for centering comprises an annular channel provided in said lower end of said housing for receiving a lip of said substantial aperture of said cup, said channel intersecting with said housing apertures to thereby define a central cross-shaped centering structure that has cross ends that interfit with said lip of said cup aperture to center said cup.

6. A dirt ejecting ball transfer unit in accordance with claim 5, wherein said central cross-shaped centering structure further comprises a central cylindrical surface extending upwardly to a level substantially consistent with an upper surface of said cup, whereby said cup lip is spaced apart from said central cylindrical surface by an annular moat.

7. A dirt ejecting ball transfer unit in accordance with claim 6, wherein said passage entries are located at spaced apart locations at a lower end of said annular moat.

8. A dirt ejecting ball transfer unit in accordance with claim 7, further comprising a drainage hole extending from said central cylindrical surface through said housing.

9. A dirt ejecting ball transfer unit, comprising:

a cylindrical housing having an open upper end and a closed lower end, said closed lower end being provided with a plurality of housing apertures in a central portion thereof;

a hemispherical cup seated in said housing, said cup having a substantial aperture in a central portion thereof;

an annular channel for receiving a lip of said substantial aperture of said cup, said annular channel being provided in said lower end of said housing and intersecting with said housing apertures to thereby define a central cross-shaped centering structure that has cross ends that interfit with said lip of said cup substantial aperture to center said cup;

a plurality of ball bearings having a diameter seated in said cup;

a load supporting ball seated on said ball bearings in said cup;

said substantial aperture in said cup and said apertures in said housing being located whereby an overlap of said substantial aperture and housing apertures define a plurality of passage entries above said housing apertures, said passage entries having an elongate shape with a minimum width which is less than said diameter of said ball bearings whereby said ball bearings are prevented from escaping from said cup, said housing apertures having a minimum width which is substantially larger than said minimum width of said passage entries;

means for retaining said ball in said cup and housing.

10. A dirt ejecting ball transfer unit in accordance with claim 9, wherein said central cross-shaped centering structure further comprises a central cylindrical surface extending upwardly to a level substantially consistent with an upper surface of said cup, whereby said cup lip is spaced apart from said central cylindrical surface by an annular moat.

11. A dirt ejecting ball transfer unit in accordance with claim 10, wherein said passage entries are located at spaced apart locations at a lower end of said annular moat.

12. A dirt ejecting ball transfer unit in accordance with claim 11, further comprising a drainage hole extending from said central cylindrical surface through said housing.

13. A dirt ejecting ball transfer unit in accordance with claim 11, wherein said housing apertures comprise four circular holes.

14. A dirt ejecting ball transfer unit in accordance with claim 13, wherein said four circular holes are symmetrically spaced around a center point of said lower end of said housing.

15. A dirt ejecting ball transfer unit, comprising:
- a housing having a closed lower end with a plurality of housing apertures therein;
- a cup seated in said housing, said cup having a substantial aperture in a central portion thereof;
- a channel in said housing lower end for receiving a lip of said substantial aperture of said cup;
- a load supporting ball supported in said cup by substantially frictionless means for supporting said ball;
- said substantial aperture in said cup and said apertures in said housing being located whereby an overlap of said substantial aperture and housing apertures define a plurality of elongate passage entries above said housing apertures, said housing apertures having a minimum width which is substantially larger than said minimum width of said passage entries;

means for retaining said ball in said cup and housing.

16. A dirt ejecting ball transfer unit in accordance with claim 15, further comprising a central centering structure for interfitting with and centering said cup.

17. A dirt ejecting ball transfer unit in accordance with claim 16, further comprising a drainage hole extending from said central centering structure through said housing.

18. A dirt ejecting ball transfer unit in accordance with claim 17, wherein said housing apertures comprise four symmetrically spaced circular holes.

19. A dirt ejecting ball transfer unit, comprising:
- a housing having an open upper end and a closed lower end, said closed lower end being provided with at least one housing aperture;
- a hemispherical cup seated in said housing, said cup having an aperture in a central portion thereof;
- a plurality of ball bearings having a diameter seated in said cup;
- a load supporting ball seated on said ball bearings in said cup;
- said cup aperture and said aperture in said housing being located whereby an overlap of said substantial aperture and housing apertures define a passage entry above said housing aperture, at least a portion of said passage entry having an elongate shape, said passage entry having a minimum width which is less than said diameter of said ball bearings whereby said ball bearings are prevented from escaping from said cup; and means for retaining said ball in said cup and housing.

* * * * *